United States Patent [19]

Fujimoto et al.

[11] Patent Number: 5,544,150

[45] Date of Patent: Aug. 6, 1996

[54] METHOD AND APPARATUS FOR DETERMINING AND INDICATING NETWORK INTEGRITY

[75] Inventors: Kenneth N. Fujimoto, Manhattan Beach, Calif.; David J. Warman, Bainbridge Island, Wash.

[73] Assignee: MediaLink Technologies Corporation, Seattle, Wash.

[21] Appl. No.: 384,567

[22] Filed: Feb. 6, 1995

Related U.S. Application Data

[63] Continuation-in-part of Ser. No. 224,481, Apr. 7, 1994, abandoned.

[51] Int. Cl.[6] .................................................. H04J 3/14
[52] U.S. Cl. .................. 370/14; 370/94.2; 370/100.1
[58] Field of Search .................................. 370/14, 16, 16.1, 370/13, 94.1, 94.2, 94.3, 100.1; 340/825.01, 825.02, 825.03, 827, 825.16, 825.14; 371/11.1, 8.1, 8.2, 9.1, 11.3; 379/26

[56] References Cited

U.S. PATENT DOCUMENTS 5,093,824  2/1992  Coan et al. ............................. 370/16
5,235,599  8/1993  Nishimura et al. ..................... 370/16

*Primary Examiner*—Benedict V. Safourex
*Assistant Examiner*—Ajit Patel
*Attorney, Agent, or Firm*—Christensen, O'Connor, Johnson & Kindness PLLC

[57] ABSTRACT

A method and apparatus are provided for determining and indicating the integrity of a network that interconnects a group of nodes. Each node includes an internal clock (42 or 58), an indicator (27) for emitting a signal at a synchronized signaling interval and a processing unit (36 or 60) electronically coupled to the indicator and the internal clock. The processing of the node causes the indicator to emit a signal at the synchronized signaling interval. When the integrity of the network is intact, the processing unit of each node causes the indicator of the node to emit a signal at the same synchronized signaling interval. As a result, all of the indicators are emitting signals in unison. When the integrity of the network has been lost due to a malfunctioning node or physical break, on a group-to-group basis, the indicators of those nodes improperly communicating with each other emit signals at different synchronized signaling intervals. As a result, the indicators emit signals in an asynchronous manner.

25 Claims, 7 Drawing Sheets

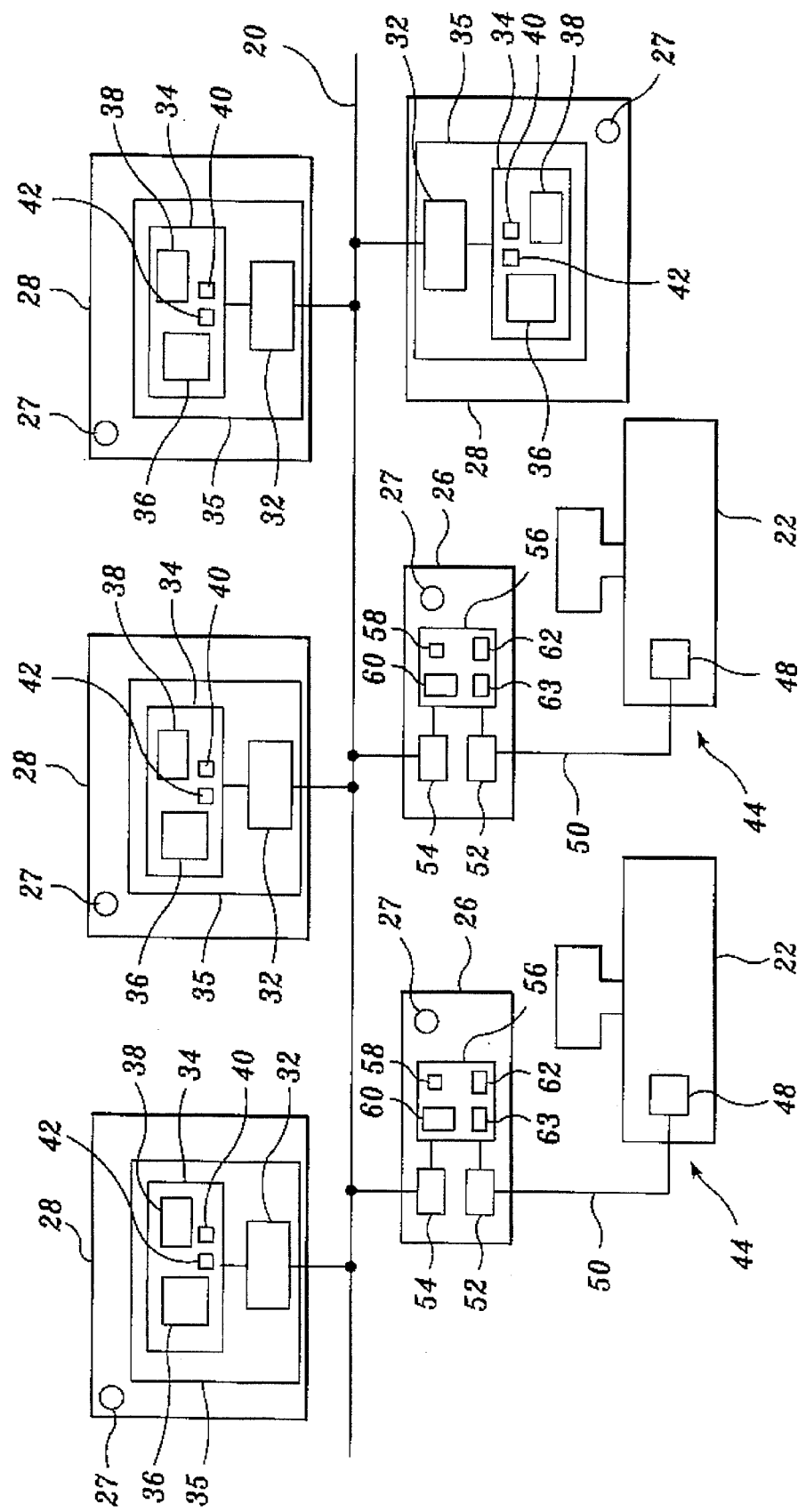

METHOD AND APPARATUS FOR DETERMINING AND INDICATING NETWORK INTEGRITY

RELATIONSHIP TO OTHER APPLICATIONS

This application is a continuation-in-part of a U.S. patent application Ser. No. 08/224,481 filed on Apr. 7, 1994, now abandoned, and entitled Method and Apparatus for Determining Network Integrity. The subject matter of application Ser. No. 08/224,481 is incorporated herein by reference.

FIELD OF THE INVENTION

This invention generally relates to a network for allowing an electronic device or computer to communicate with one or more other electronic devices or computers over a coupling medium and, more particularly, a method and apparatus for determining and indicating the integrity of such a communication network.

BACKGROUND OF THE INVENTION

Networks for connecting together a number of computers and associated electronic devices are now common place in a wide variety of environments. A network can be as small as a local area network consisting of a few computers and/or other electronic devices, or it can consist of many devices and computers distributed over a vast area. Virtually any electronic device equipped with the necessary hardware can be connected to a computer via a network. Suitable electronic devices include lamps, television sets, VCRs, video cameras, telephones, amplifiers, CD players, equalizers, etc.

Each computer and/or electronic device that is connected to the network and is capable of communicating with other electronic devices or computers connected to the network can be referred to as a node. An underlying network protocol is used to establish communication and ensure reliable transfer of information between the nodes of the network. A network can involve permanent connections, such as cables, or temporary connections made through telephone or other communications links. Communication between nodes can break down because of a malfunctioning or nonfunctioning node or because of a severed cable, wire or other communications link between two nodes on the network. Unfortunately, when a break in communications via the network occurs, there is no satisfactory system for immediately determining and indicating that a network break has occurred.

Accordingly, a method and apparatus for instantly determining and indicating the existence of a break is needed. The method and apparatus should provide any users of the network with an immediately recognizable signal of which nodes continue to communicate with one another. Further, the method and apparatus should neither depend on the type of underlying network protocol, nor interfere with the normal operation of the network. As described in the following, the present invention provides a simple and elegant method and apparatus that meet these criteria.

SUMMARY OF THE INVENTION

In accordance with the present invention, a method and apparatus are provided for determining and indicating the integrity of a network whose integrity is lost when a break in communication via the network occurs. The network interconnects a group of nodes. Each node in the group includes an internal clock, an indicator for emitting a signal at a synchronized signaling interval and a processing unit electronically coupled to the indicator and the internal clock. When the integrity of the network is intact, the processing unit of each node causes the indicator of the node to emit a signal at the synchronized signaling interval such that all of the indicators are emitting signals in unison. When the integrity of the network has been lost due to a malfunctioning node or physical break, the indicators of those nodes improperly communicating with each other emit signals at different synchronized signaling intervals such that the indicators emit signals in an asynchronous manner.

More specifically, the processing unit of each node includes a memory for storing program instructions which control the processing unit so that the processing unit causes the indicator to emit a signal at a synchronized signaling interval. Specifically, the processing unit of each node in the group responds to the programmed instructions to function as a generator for generating and broadcasting synchronization packets and a processor for receiving and processing synchronization packets to determine the synchronized signaling interval. However, the generator of a node only generates and broadcasts synchronization packets when the node meets a predetermined set of conditions so that only the generator of one node in the group generates and broadcasts synchronization packets over the network. Each synchronization packet generated contains unique data, preferably a random number. The broadcasted synchronization packets are received by the nodes and processed to determine the synchronized signaling interval. Specifically, the processor determines the synchronized signaling interval as a function of the unique data contained in the synchronization packet. If the network is unbroken, all of the nodes receive the same synchronization packet and thus the same unique data. As a result, the indicators of the nodes emit signals at the same interval.

When the integrity of the network has been lost because of a break in communication, the group of nodes interconnected by the network is divided into a first group of nodes and a second group of nodes. Using the same predetermined set of conditions used when the network was intact, one node of each group becomes the node that generates and broadcasts synchronization packets to the other nodes of that group. As the processor of each node of the first group receives synchronization packets, the processor processes the synchronization packets as described above and determines a first synchronized signaling interval. The interval is the same for each node of the first group, since each node receives the same synchronization packet and, thus the same unique data. Meanwhile, the processor of each node of the second group processes received synchronization packets as described above and determines a second synchronized signaling interval. Again, the interval is the same for each node of the second group since each node receives the same synchronization product and, thus, the same unique data. However, the synchronization intervals of the first and second groups are different because the groups receive different synchronization packets, which contain different unique data. Consequently, while the indicators of each node of the first group emit signals in synchrony and the indicators of each node of the second group emit signals in synchrony, the indicators of the nodes of the first group emit signals asynchronously with respect to the signals emitted by the indicators of the nodes of the second group.

In summary, when the integrity of the network has not been lost, all of the nodes form a common group that are able to communicate properly with each other. In this case, the indicators of all of the nodes of the network emit signals in synchrony. If the integrity of the network is lost due to one or more breaks in the network, the nodes are divided into a plurality of groups of nodes, resulting in the indicators of each group emitting signals asynchronously with respect to the signals emitted by the indicators of the other groups.

In accordance with the other aspects of this invention, each of the nodes includes an internal clock and the broadcast synchronization packets include time copied from the internal clock of the node that generates the synchronization packets that are broadcast.

In accordance with the further aspects of the invention, the time contained in the broadcast synchronization packet includes a microsecond value and the microsecond value forms the unique data that is used to establish the synchronization interval.

In accordance with other further aspects of this invention, only selected broadcast synchronization packets are processed by the processor of each node. Other broadcast synchronization packets received by the nodes and not processed.

A method including steps generally consistent with the functions implemented by the elements of the apparatus described above represents a further aspect of this invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is a block diagram of the bus network and the interconnected electronic devices and personal computers shown in FIG. 1;

DETAILED DESCRIPTION OF THE PREFERRED EMBODIMENT

Figure 1:
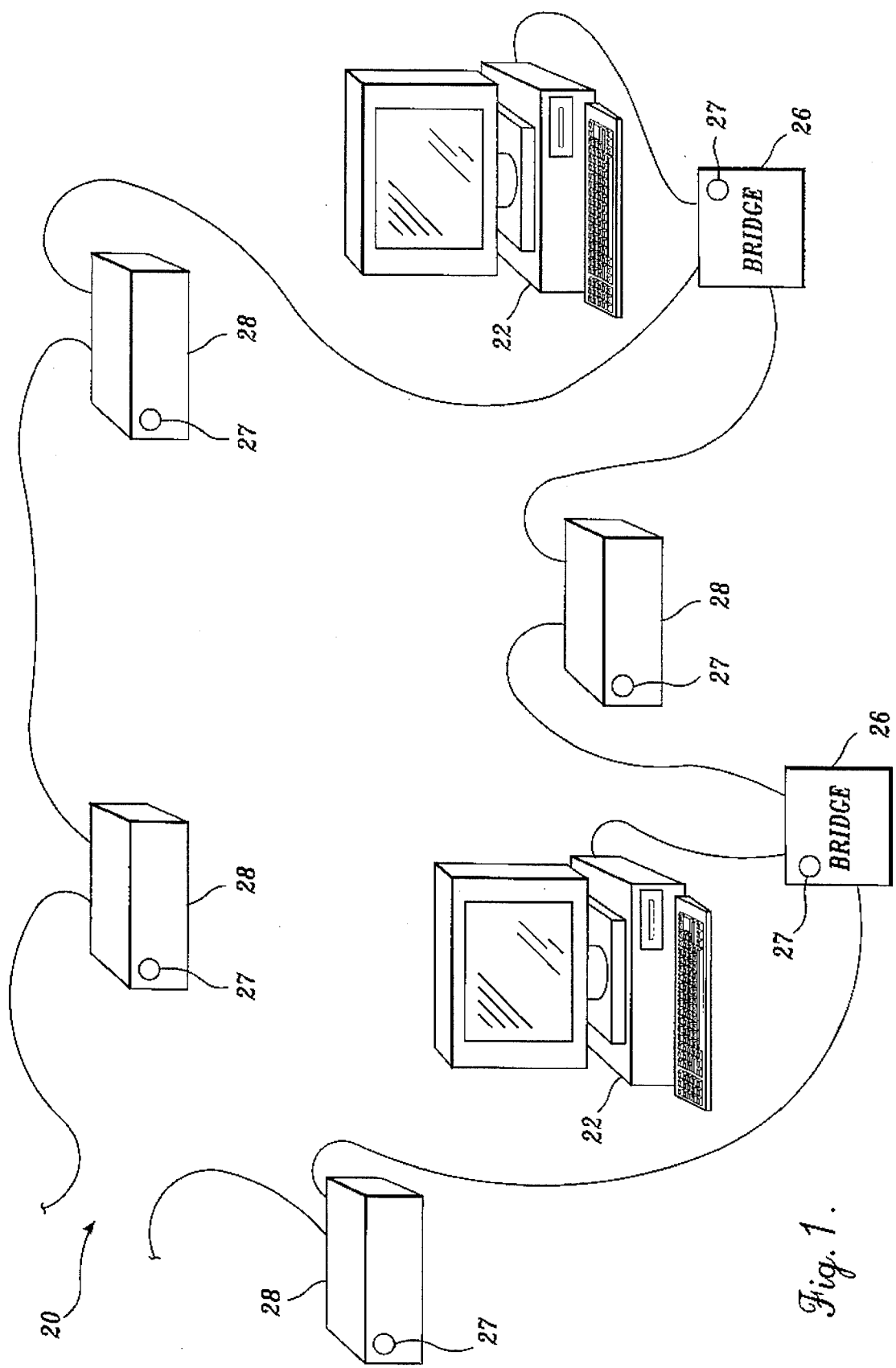
FIG. 1 is a pictorial diagram of a plurality of electronic devices and personal computers interconnected by a bus network of the type with which the present invention can be used.

FIG. 1 illustrates a bus network 20 interconnecting a plurality of personal computers 22 and a plurality of electronic devices 28. Each of these devices and computers connected to the bus network 20 is depicted as a node 1 through 6 in FIGS. 3A and 3B. As will be appreciated by those familiar with networked computer systems from the following description, depending on system capacity, any number of electronic devices and computer systems could be connected via the bus network 20, if equipped with the necessary interface hardware. As discussed in co-pending U.S. patent application Ser. No. 08/334,416, filed Nov. 4, 1994, and titled A Method and Apparatus for Controlling Non-Computer System Devices by Manipulating a Graphic Representation, the subject matter of which is incorporated herein by reference, suitable electronic devices may include video cameras, speakers, television sets, telephones, lamps, etc. Even a simple light switch can form a node on bus network 20. In addition, any computer system including but not limited to portable computers, powerbooks, personal device assistants, etc. that is equipped with the necessary interface hardware, e.g., bridge 26, may be connected to bus network 20. However, the present invention does not require that a computer system of any type be connected to the bus network. That is, it is possible for the bus network to connect only a plurality of electronic devices and/or bridges.

The present invention provides a method and apparatus that instantly determines and indicates the existence of a break in communication between the nodes 1 through 6 of the bus network 20. As will be better understood from the following description, this is accomplished by causing each bridge 26 of a personal computer 22 and each electronic device 28 connected to the bus network 20 to emit a signal, preferably a pulse of light emitted by an LED 27. However, one of ordinary skill in the art will recognize that any signal perceptible to the human senses will suffice, e.g., an audible tone. One of the devices is uniquely chosen in accordance with a predetermined protocol to cause all of the LEDs to emit a pulse of light or blink in unison. If a node malfunctions or the bus network is broken, the LEDs of the nodes blink in an asynchronous manner. In the case of a node malfunction, the LED of the malfunctioning node blinks asynchronously with the LEDs of the remaining nodes. In the case of a break in the bus network, the nodes on one side of the break blink asynchronously with the nodes on the other side of the break.

Inter-Device Communication

FIG. 2 illustrates the bus network 20 interconnecting the same electronic devices 28 and personal computers 22 shown in FIG. 1. Each electronic device 28 includes an interface 35 comprising an input/output (I/O) board 32 and a processor board 34 which allow the devices to be directly connected to the bus network 20. The I/O board 32 is specifically constructed for use with the bus network configuration and a particular type of coupling medium, whereas the processor board 34 can be used with different communication configurations and coupling media.

The processor board 34 of the interface 35 controls the communication of the devices 28 over the bus network 20. The processor board 34 includes a processor 36, an electrically erasable programmable read-only memory (EEPROM) 38, a random access memory (RAM) 40 and an internal clock 42. The EEPROM 38 is used by the processor 36 to control the functionality of the electronic device 28 and stores its own operating system. The RAM 40 is used by the processor 36 to temporarily store program code and data. Finally, the device interface 35 includes a light emitting diode (LED) 27 which indicates that the device interface 35 is in communication with the bus network 20. One of ordinary skill in the art will recognize that the interface 35 includes many more components than those shown in FIG. 2. Such components are not described because they are conventional, and a description of them is not necessary to an understanding of the present invention.

When an electronic device 28 sends data, a command, or program code (collectively referred to herein as data) the processor board 34 of the interface 35 housed in the device constructs a packet of data representing the relevant information. The processor board 34 determines the time in which the bus network 20 is available for sending the packet. The processor board 34 sends the packet to the I/O board 32 at the appropriate time, and upon receipt of the packet, the I/O board transmits the packet via the bus network 20 to the other devices and computers. When an electronic device 28 receives data from a data source, such as personal computer 22 or another device 28, the I/O board 32 receives the packet over the bus network 20, and sends the packet to the processor board 34. Upon receipt of the packet, the processor board 34 of the interface 35 processes the packet and performs any appropriate function, possibly including sending back a response packet.

Also shown in FIG. 2, is each of the personal computers 22 connected to the bus network 20 by way of an RS232 interface 44 and a bridge 26. Standard personal computers typically include an RS232 card 48 and an RS232 cable 50 for communicating with external devices such as printers. RS232 is an interface standard that specifies signal voltage levels, etc. RS232 is also a byte-level communication protocol that specifies start bits, stop bits, etc. for sending bytes of data. Generally, a higher level communication protocol is used on top of the RS232 byte-level communication protocol, i.e., the personal computers 22 include software defining a point-to-point communication protocol that is used on top of the RS232 byte-level protocol.

The bridge 26 provides the interface between the RS232 cables 50 and the bus network 20, on which a network communication protocol is used. The bridge 26 includes a RS232 I/O card 52 for connecting to the RS232 cable 50, and a second I/O card 54 that is constructed for connecting to the communication medium of the bus network 20. The bridge 26 includes a bridge processor board 56 connected to each of the I/O boards 52, 54, to translate between the point-to-point protocol and the bus network communication protocol used on the bus network 10. However, to make the bridge 26 compatible with a different communication medium and/or communication protocol, the I/O boards 52, 54 could be replaced with more appropriate I/O boards.

The circuitry of the bridge 26 includes many of the same components as the interface 35 of an electronic device 28 and thus, receives and transmits packets of data in much the same manner. The bridge processor board 56 includes a processor 60, e.g., one of the HC 11 family of Motorola processors. The bridge processor board 56 also includes an internal timing clock 58, a random access memory (RAM) 62, and electrically erasable programmable read-only memory (EEPROM)63. The EEPROM 63 is used by the bridge processor 60 to control the functionality of the bridge 26 and stores its own operating system. The RAM 62 is used by the bridge processor 60 to temporarily store program code and data. Finally, the bridge 26 also includes a light emitting diode (LED) 27 which indicates that the bridge is in communication with the bus network. One of ordinary skill in the art will recognize that the bridge 26 includes many more components than those shown in FIG. 2. Such components are not described because they are conventional, and a description of them is not necessary to an understanding of the present invention.

The bus network 20 shown in FIGS. 1 and 2 can be formed of various coupling media such as glass or plastic fiber optic cables, coaxial cables, twisted wire pair cables, ribbon cables, etc. In addition, one of ordinary skill in the art will appreciate that the coupling medium can also include a radio frequency coupling medium or other coupling media. It is generally preferable to use fiber optic cables, as fiber optic cables are highly immune to electromagnetic interference and are capable of carrying signals over long distances without significant attenuation. As described herein, the bus network 20 represents a fiber optic cable. Accordingly, the I/O board 32 of interface 35 shown in FIG. 2 is constructed for use with a fiber optic cable.

Network Communication Protocol

Various network communication protocols can be used to communicate over the bus network 20. The particular network communication protocol used is dictated by the program code utilized by the processors 34 of the electronic devices 28 and the bridge processors 60 of the bridges 26 connected to the personal computers 22. In one actual embodiment of the present invention, the network communication protocol used to communicate over the bus network 20 is of the type disclosed in commonly assigned U.S. Pat. No. 5,245,604, entitled "Communication System," the disclosure and drawings of which are specifically incorporated herein by reference. The network communication protocol described in U.S. Pat. No. 5,245,604 is referred to herein as the MediaLink protocol. The advantage of the MediaLink protocol is that is provides an upper limit on the amount of time it takes to communicate over the bus network 20. This is important in real-time environments such as a staged musical performance, where unpredictable delay would result in unacceptable distortion. As all network communication protocols must, the MediaLink protocol includes a network resource sharing and management algorithm such that only one device communicates over the bus network 20 at any one given time and such that each device has sufficient access to the bus network 20.

Figure 3A:
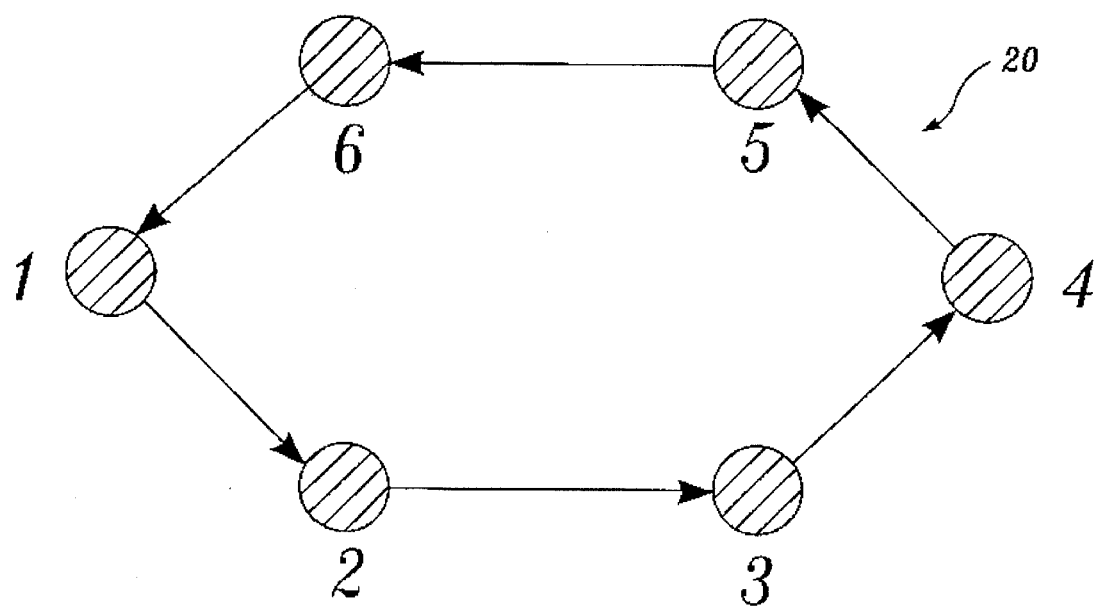
FIG. 3A is a block diagram illustrating the electronic devices and personal computers shown in FIGS. 1 and 2 as a plurality of nodes 1 through 6 interconnected via the bus network.

As shown in FIG. 3A, the personal computers 22 and electronic devices 28, including personal computer bridges 26 and device interfaces 35, may be depicted as a plurality of nodes numbered in increasing numerical order as 1, 2, 3, 4, 5, and 6, wherein nodes 1 through 6 are displaced from one another and are operative under the MediaLink protocol to become activated in a sequence. It is immaterial for purposes of this discussion which electronic device or personal computer comprises which node. It is only necessary that the electronic devices and personal computers are equipped with the necessary hardware, e.g., device interface 35 or personal computer bridge 26, to connect to the bus network and embody the present invention. It will be appreciated that a vast array of electronic devices and computer systems equipped with such hardware may comprise individual nodes on the bus network. It will also be appreciated that the number of the nodes in the sequence can vary from 2 to n, where n is theoretically any number, but in reality is limited by the ability of the network to transmit messages within an adequate period of time.

Figure 3B:
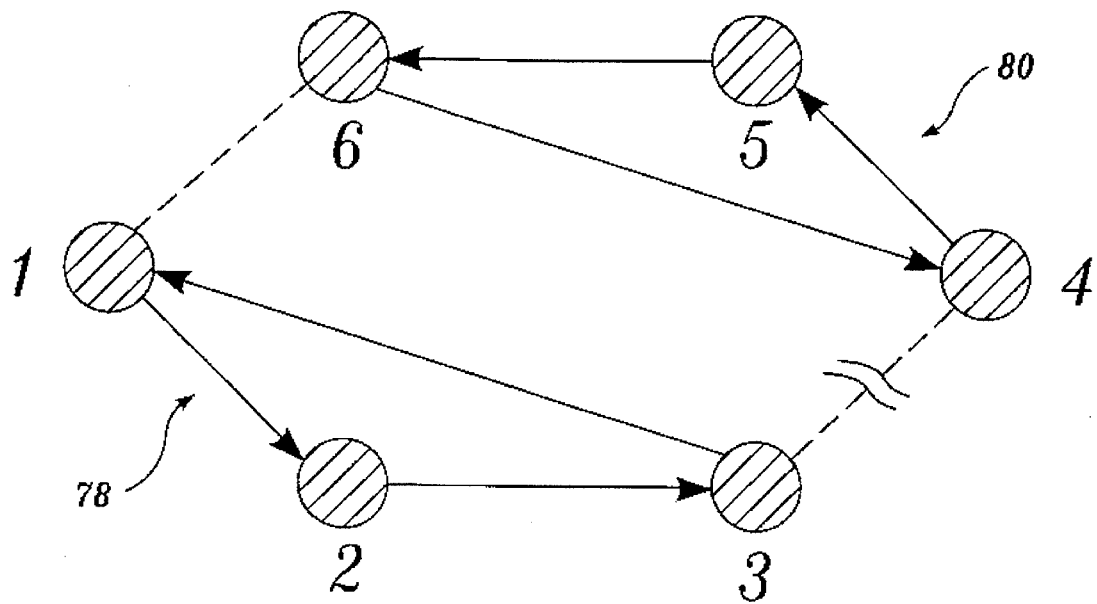
FIG. 3B is a block diagram of the interconnected nodes 1 through 6 shown in FIG. 3A after a break in the bus network has occurred.

In normal operation, the nodes 1 through 6 become successfully activated and communicate data packets to one another so that only one node is allowed to transmit data packets over the bus network 20 at any one time. A particular node is "activated," i.e., a particular node is allowed to communicate data packets, after it receives an activating packet from another node in the sequence. Sending an activating packet to a particular node is referred to as "passing the vector" and is depicted in FIGS. 3A and 3B by solid directional arrows. Meanwhile, receiving the activating packet is referred to as "receiving the vector."

Each node in the sequence identifies: (1) itself with a "current node number"; (2) a next node in the sequence with a "next node number"; and (3) a previous node in the sequence, i.e., the node from which it received the vector, with a "previous node number". For example, the node designated with a number "4," or "node 4," in FIG. 3A has a current node number equal to four, a next node number equal to five and a previous node number equal to three. However, it is possible that node 3 has not been activated yet or that it has been deactivated. Consequently, node 4 receives the vector from node 2. Thus, node 4 has a previous node number equal to two, while node 2 has a next node number equal to four.

One node of the network is also identified as the "lowest numbered node." The lowest numbered node on the network is the node whose previous node number is greater than its current node number. For instance, in the bus network 20 illustrated in FIG. 3A, node 1 is the lowest numbered node because its previous node number is six and its current node number is one. It will be appreciated that if the original lowest numbered node is deactivated or malfunctions, a new lowest numbered node for bus network 20 shall be identified. For example, node 2 would become the lowest numbered node if node 1 were deactivated. As will be better understood from the following description, the lowest number node is the one that controls the synchronized blinking of the LEDs 27 associated with the personal computers 22 and electronic devices 28 connected to the bus network 20.

As mentioned above, when a node receives the vector from its previous node, the node is activated and allowed to send data packets to another node(s) on the bus network 20. When the activated node sends a data packet to another node(s), this notifies its previous node that it has received and accepted the vector. When the other node(s) receives the data packet from the activated node, the other node(s) responds after a particular period by transmitting a data packet back to the activated node. The activated node may then pass the vector to the next node in the sequence. In this way, each node 1 through 6 in the sequence progressively receives the vector as depicted by the solid directional arrows, and transmits data packets to other nodes in the sequence. The activation and deactivation of nodes under the MediaLink protocol as described in more detail in U.S. Pat. No. 5,245,604 previously incorporated herein by reference.

Communication between nodes in the bus network 20 can breakdown because of a malfunctioning or non-functioning node or because of physical damage to the coupling media connecting two nodes on the bus network. If a node is non-functioning and thus, not communicating with any other node, the node is simply deactivated under the MediaLink protocol. If a node is malfunctioning and communicating improperly with the remaining nodes, or if there is a physical break in the coupling media forming bus network 20 occurs, the bus network becomes divided into two subnetworks. In the first instance, the malfunctioning node forms a single node subnetwork and the remaining nodes comprising the other subnetwork. In the latter case, the nodes on one side of the break form one subnetwork and the nodes on the other side of the break form a second subnetwork.

An example of the latter instance is illustrated in FIG. 3B where a physical break in the bus network between nodes 3 and 4 has occurred. In this case, the bus network will effectively separate into a first subnetwork 78 comprising nodes 1, 2 and 3, and a second subnetwork 80 comprising nodes 4, 5 and 6. The nodes in each subnetwork continue to communicate with each other, but are not able to communicate with the nodes of the other subnetwork because of the break in the network. Under the MediaLink protocol, each subnetwork 78 and 80 will now contain its own lowest numbered node. In the first group, the original lowest numbered node remains the lowest numbered node because its previous node number(three) is greater than its current node number(one). In the second subnetwork, node 4 becomes the lowest number node because its previous node number (six), is greater than its current node number (four). It will be appreciated that if another break occurs, the bus network will divide into three subnetworks, with each of the three subnetworks containing a lowest numbered node, and so on for multiple breaks.

As noted above, and more fully described below, the lowest numbered node is the one that controls the blinking of the LEDs 27 of the bridges 26 of personal computers 22 and electronic devices 28 of the related network or subnetwork. It is in response to a particular type of data packet generated by the lowest number node in each of the subnetworks that an observable asynchronous blinking of the LEDs 27 of the two (or more) subnetworks is created. While the MediaLink protocol and the bus network 20 as described above are presently preferred, it is to be understood that the present invention will also find use in other network protocols and networks other than the type shown in FIGS. 1, 2, 3A and 3B.

Determining and Indicating the Integrity of the Network

As mentioned earlier, each node on the bus network 20, whether a bridge 26 of a personal computer 22 or a device interface 35 of an electronic device 28, is equipped with an LED 27. If all nodes on the bus network are communicating with each other properly, the integrity of the bus network is intact. As a result, all of the LEDs 27 will blink at precisely the same time, i.e., the LEDs will blink synchronously. When a node malfunctions or one or more breaks in the bus network occurs, as described above, information about the existence of a break is produced by causing the LEDs 27 to blink asynchronously. More specifically, the asynchronous blinking informs a user that a node malfunction or break has occurred. In the case of a node malfunction, the LED of the malfunctioning node will blink asynchronously with respect to the blinking of the LEDs of the remaining nodes which are blinking in unison. Thus, the malfunctioning node can be readily identified. In the case of a physical break in the network, the asynchronous blinking informs the user that a break has occurred and that some nodes are still communicating with each other. When a break occurs, those nodes which are still communicating with each other form a subnetwork, wherein the LEDs of those nodes blink in unison. In the example shown in FIG. 3B, the asynchronous blinking of first subnetwork 78 with respect to second subnetwork 80 indicates that a break has occurred between the two subnetworks.

Figure 4:
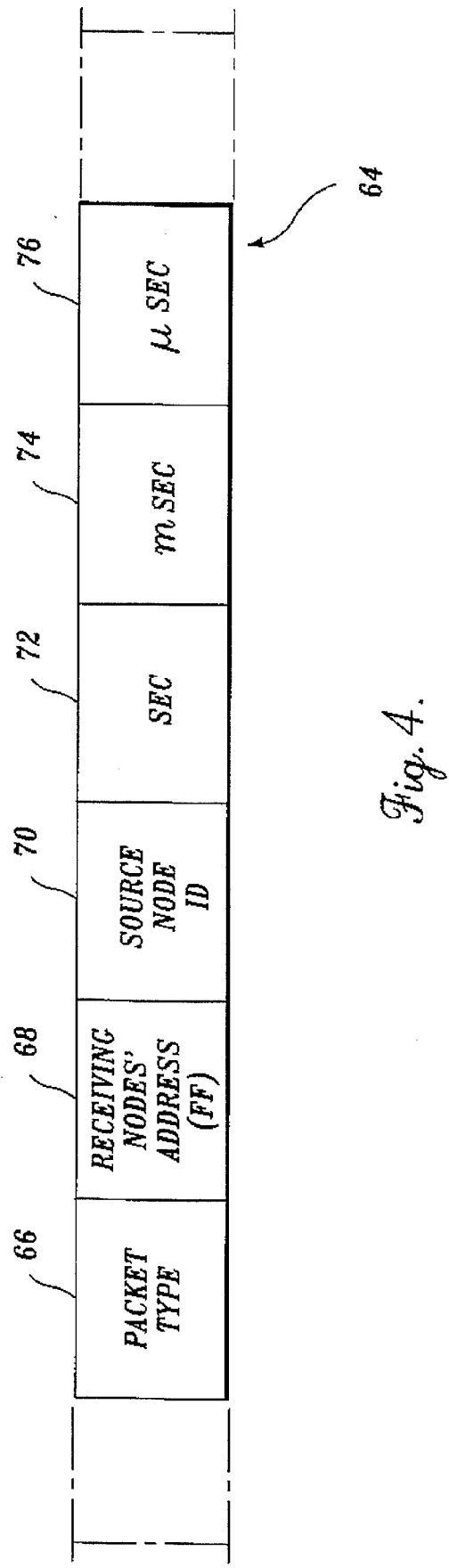
FIG. 4 is a diagram of a synchronization packet generated by the present invention.

Each node's LED 27 blinks in response to a 32-bit synchronization packet 64 that is routinely broadcast to all nodes of the bus network 20 by the lowest numbered node of the network or subnetwork as the case may be. As illustrated in FIG. 4, the synchronization packet 64 comprises at least six fields. Those of ordinary skill in the art will recognize that the packet may contain additional fields for storing flags, start and stop bits, checksum bits, etc. that are used by any network protocol for transmission of a packet. However, these fields are not described because they are conventional and a description of them is not necessary to an understanding of the present invention. Returning to the synchronization packet 64, a first field 66 identifies The packet type as a synchronization packet. A second field 68 identifies the nodes to which the synchronization packet is being sent. Since the synchronization packet is being broadcast to all of the other nodes of the network, this field contains a generic address (a hexadecimal FF) that indicates each node is to receive the synchronization packet and process it. A third field 70 identifies the source node sending the synchronization packet, i.e., the lowest numbered node. The three remaining fields 72, 74 and 76 contain a "time stamp." More specifically, a precise time as clocked in seconds, milliseconds and microseconds by the internal clock, e.g., clock 42 of an electronic device 28, of the lowest numbered node is "stamped" or copied into the respective fields 72, 74 and 76 of the synchronization packet when the synchronization packet is generated. Thus, field 72 contains a seconds value, field 74 contains a milliseconds value and field 76 contains a microseconds value as clocked when the synchronization packet is generated by the lowest numbered node.

Figure 5:
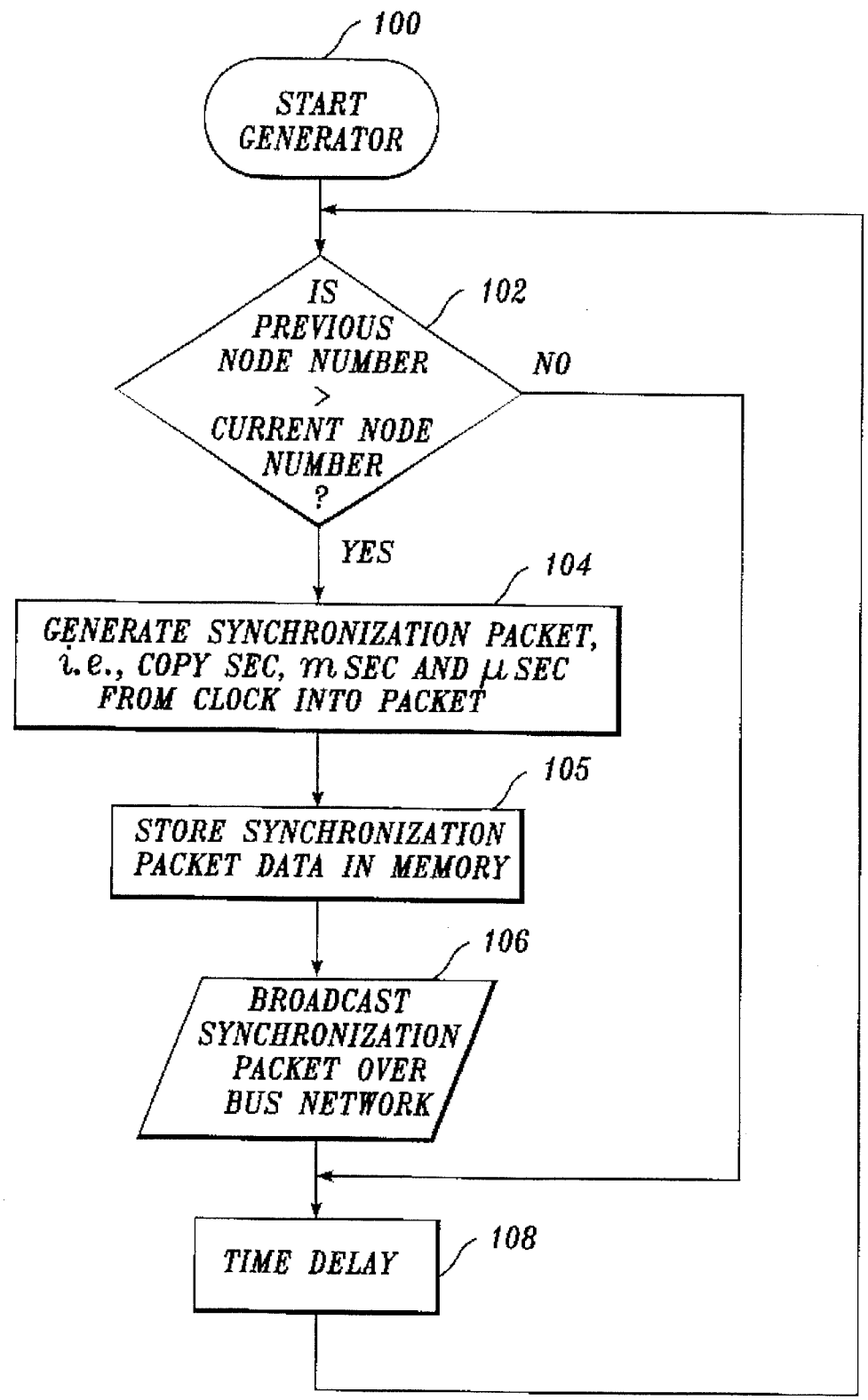
FIG. 5 is a flow chart illustrating the logic used by each node of the network to generate a stream of synchronization packets.
Figure 6:
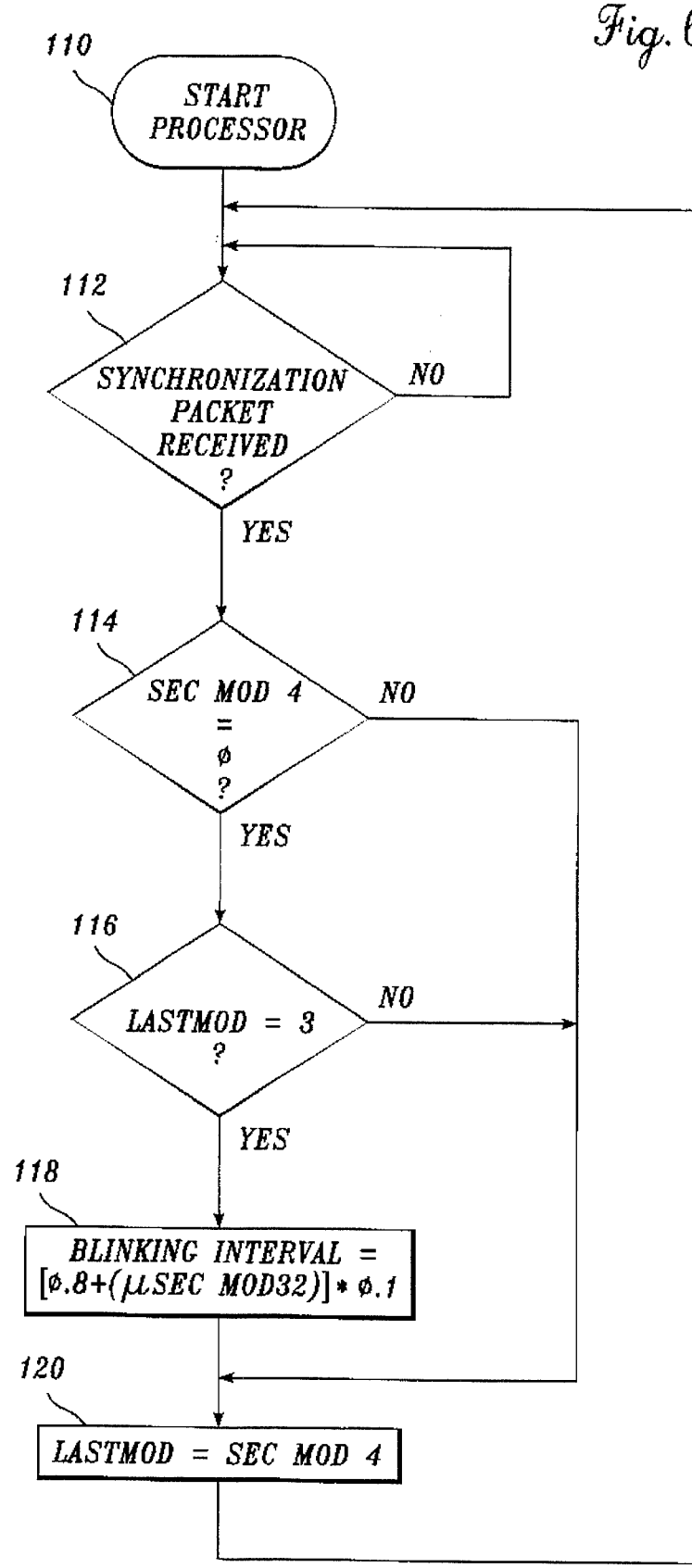
FIG. 6 is a flow chart illustrating the logic used by each node for processing the stream of synchronization packets.
Figure 7:
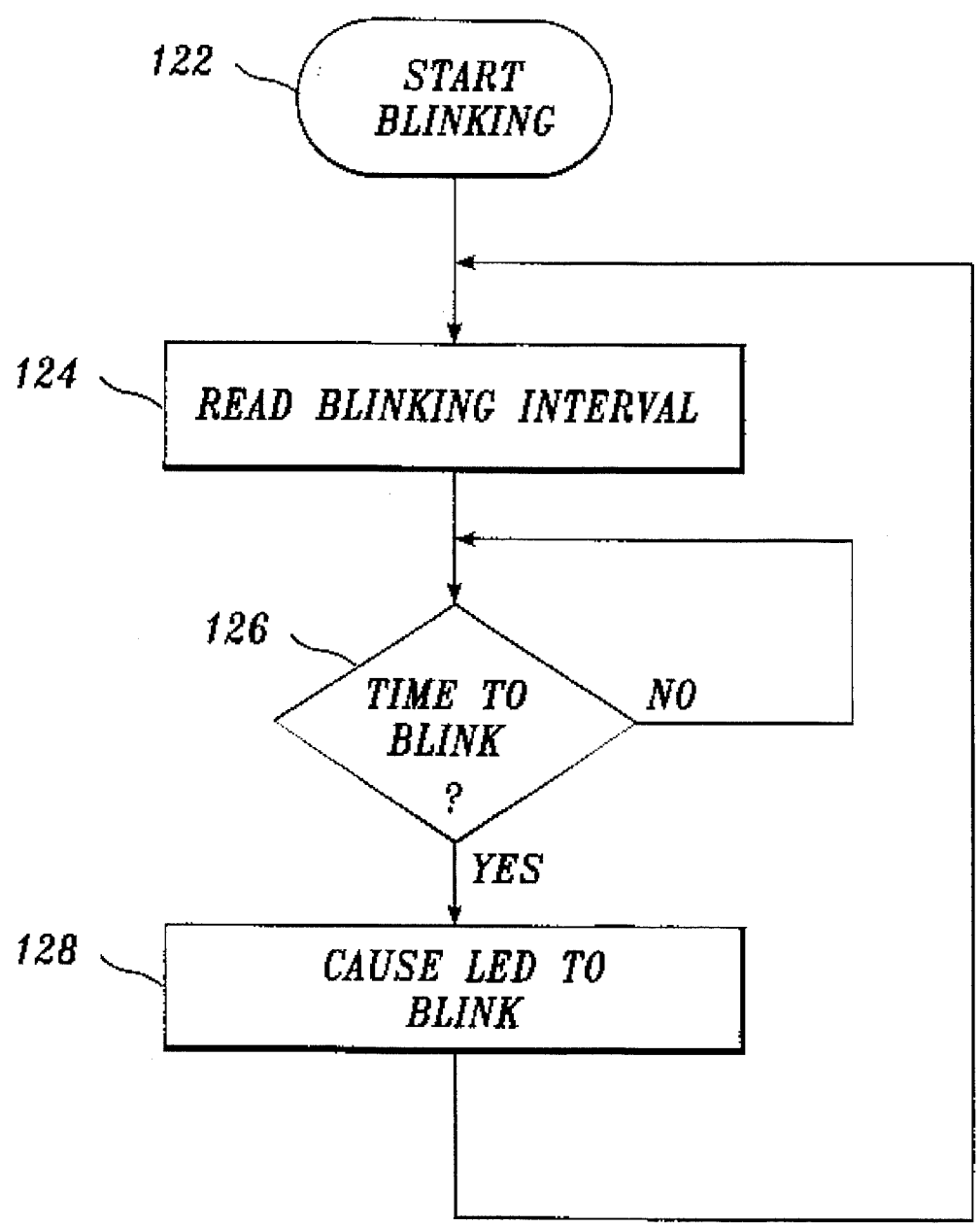
FIG. 7 is a flow chart illustrating the logic used by each node to cause each node of the network to emit light signals in response to the synchronization packets which indicate the existence of a break in the bus network.

The synchronization packets are generated and processed by program code stored in memory of each node, e.g., EEPROM 38 of device interface 35 or EEPROM 63 of personal computer bridge 26. In one actual embodiment of the present invention, the program code is organized into three independent modules. The first module is referred to as a synchronization packet generating module and is illustrated in FIG. 5; the second module is referred to as a synchronization packet processing module and is illustrated in FIG. 6; and the third module is referred to as a blinking module and is illustrated in FIG. 7. The program code making up the modules is concurrently processed by the bridge processor 60 of a personal computer bridge 26 or the processor 36 of a device interface 35, as the case may be, as required. In the interest of clarity and ease of understanding, the modules are hereinafter described as if employed by each node in sequential order, beginning with the synchronization packet generating module illustrated in FIG. 5. Obviously in actual embodiments of the present invention, each node will employ each module in an order determined by the operating system of that node, e.g., operating system 63 of a personal computer bridge 26. Hence, it is to be understood that each module may be called and exited at any time as determined by the operating system. The modules will initially be described as employed when the integrity of the bus network 20 is intact, i.e., when a break has not yet occurred. This discussion will be followed by a description of the modules as employed when the integrity is lost, i.e., when a break occurs.

Now referring to FIG. 5, when the integrity of the bus network 20 is intact, the logic comprising the synchronization packet generating module is employed concurrently by each node on bus network 20. However, only the lowest numbered node will actually generate the synchronization packets 64. Initially, each node asks whether or not it is the lowest numbered node. More specifically, as shown by decision block 102 each node performs a test to determine if the number of the previous node, the node from which the node performing the test "received the vector," is greater than the number of the node performing the test. If the result is negative, the logic proceeds to block 108, where a time delay waiting period begins. In one actual embodiment of the invention, the time delay is 0.1 seconds. At the end of this waiting period, the logic returns to decision block 102, and the node is again tested to determine if it is the lowest numbered node. It follows that blocks 102 and 108 are repeated indefinitely by every node of the bus network except the lowest numbered node, i.e., in the example shown in FIG. 3A, the blocks 102 and 108 are repeated indefinitely by nodes 2 through 6, but not by lowest numbered node 1.

In the case of the lowest numbered node, the result of decision block 102 is positive and the logic proceeds to a block 104 where a synchronization packet 64 is generated. While the use of a network protocol that identifies a lowest numbered node is presently preferred, as will be readily recognized by those of ordinary skill in the electronic network art, the invention can also be used in network communication protocols where a lowest numbered node is not identified. In such networks, a unique node may be arbitrarily selected to act as a lowest numbered node and generate synchronization packets, or the unique node may be determined as a function of some predetermined set of conditions specified by some other network protocol. Thus, it is to be understood that the present invention is not dependent on or limited by the type of network protocol described herein.

As noted above, the lowest numbered node generates a synchronization packet preferably in the form shown in FIG. 4 and previously described, i.e., a synchronization packet that includes the seconds value, milliseconds value and microseconds value. The time values are copied from the internal clock of lowest numbered node into the seconds field 72, milliseconds field 74 and microsecond field 76 of the synchronization packet, respectively. Once the synchronization packet is generated, the logic proceeds to a block 105 and the data contained in the fields of the generated synchronization packet is stored in memory of the lowest numbered node, e.g, RAM 39 of a device interface 35, so that the lowest numbered node "receives" the synchronization packet it has generated without broadcasting it to itself. Next, in block 106, the lowest numbered node broadcasts the synchronization packet to the other node of the bus network 20. Then the program cycles to block 108, where the time delay waiting period takes place. At the end of the waiting period, the logic returns to block 102 and the cycle is repeated. In summary, the lowest numbered node generates and broadcasts a stream of synchronization packets to the other nodes of the bus network at the rate of the time delay, e.g., once every tenth of a second. Obviously synchronization packets may be generated more or less frequently, as desired, without departing from the scope of the invention.

Upon receipt of a synchronization packet 64, each node, including the lowest numbered node, processes the packet and control interval at which the LED 27 of the node blinks. The logic employed by each node to process the synchronization packet is illustrated in FIG. 6. At decision block 112, a test is made to determine if a synchronization packet 64 has been received by the node. If the result is negative, the logic merely repeats the test until a synchronization packet is received. Hence, each node is constantly polling the bus network 20 for a synchronization packet. When the synchronization packet is received by the node, the logic proceeds to blocks 114 through 120 where the synchronization packet is processed by the node in order to determine an interval at which the LED 27 of the node will emit a pulse of light, i.e., blink.

As long as the integrity of the bus network 20 is intact, each node will determine the same blinking interval as the blinking intervals determined by every other node of the bus network 20, resulting in all of the LEDs 27 of nodes 1 through 6 blinking in synchrony. This is possible only if each node uses the same synchronization packet to determine its blinking interval. In addition, in order to be easily perceptible by the human eye, only one synchronization packet every four seconds is used to set the blinking interval in the embodiment of the invention described herein. In other words, only one out of every forty of the common synchronization packets received by each node is selected or "used" to determine the blinking interval. The "used" synchronization packet is hereinafter referred to as the relevant synchronization packet. Those of ordinary skill in the art will recognize that the number of synchronization packets used to set the blinking interval may be increased or decreased as desired without departing from the scope of the present invention.

The relevant synchronization packet is the first synchronization packet 64 received during a four second interval whose seconds field 72 is evenly divisible by a value of 4. Hence, at block 114, a test is made to determine if the remainder after the seconds value (contained in the seconds field 72 of the received synchronization packet) is divided by four (SEC MOD 4 in block 114) is equal to zero. A positive result at this juncture does not ensure that the node has found the relevant synchronization packet because several synchronization packets with the same seconds value are received during each second interval. In the case of the 0.1 second delay interval previously described, ten synchronization packets with the same second value are received during each second interval. Only one of the synchronization packets received during a second interval divisible by four is the relevant synchronization packet, namely, the first synchronization packet received during the interval. The next step in the program determines if the received synchronization packet is the first synchronization packet received in a seconds interval that is divisible by four. More specifically, at decision block 116, a test is made to determine if the last remainder value calculated in block 114 (LASTMOD) is equal to three. If so, the received packet is the relevant synchronization packet, since it is the first synchronization packet to occur in a seconds interval divisible by four.

If the result of either decision block 114 or 116 is negative, the logic proceeds to a block 120 where the value of LASTMOD is set equal to the last remainder value calculated in block 114. The logic then returns to decision block 112 to await the receipt of another synchronization packet 64.

Each time a relevant synchronization packet is identified, a new blinking interval is set as a function of the time stamp of that packet. As a result, the blinking interval changes every time a new synchronization packet is identified. Because a microsecond is such a small unit of time, the microsecond value clocked when the relevant synchronization packet was generated and stored in microsecond field 76 is virtually random. This randomness is used to set the blinking interval. More specifically, the blinking interval is set as a function of the microsecond value found in microsecond field 76 of the relevant synchronization packets. While the randomness of the microsecond value is useful in setting the blinking interval, obviously triggering an LED on and off at a microsecond rate is not humanly perceivable. As a result, while random, the blinking interval must be adjusted to fall in a time range that can be humanly perceived. This is accomplished by the next portion of the processing module illustrated in FIG. 6. Specifically, a blinking interval, using the microsecond value, is determined (in seconds) by the following formula:

$$[0.8+(\mu sec\ MOD\ 32)]*0.1],$$

where μsec MOD 32 is the remainder after the microsecond (μsec) value has been divided by 32. In essence, the formula creates a humanly perceptible random blinking interval above 0.8 seconds, the range varying from 0.8 seconds to 3.9 seconds.

It will be appreciated that other factors or formulas may be used to determine the blinking interval without departing from the scope of the present invention. One of ordinary skill in the art will recognize that in other actual embodiments of the present invention the blinking interval could be determined as a function of a random number simply stored in a field of the synchronization packet. The need for randomness between the receipt of relevant synchronization packets will become better understood below. In essence, randomness is used to create an interval between blinks that is both humanly perceptible if the bus network is broken or if one of the nodes malfunctions, and different between the nodes of the bus network located on opposite sides of the break or between the malfunctioning node and the remainder of the nodes.

After the blinking interval has been determined, it is stored in memory, e.g., RAM 39 of a device interface 35, and the logic proceeds to block 120 where the last remainder is reinitialized (LASTMOD=SEC MOD 4) as previously described. The logic then returns to decision block 112 and awaits the receipt of another synchronization packet. Blocks 114 through 120 are then repeated for each received synchronization packet.

In summary, once every four seconds each node calculates a new blinking interval. The blinking interval calculated every four seconds will vary depending on the microsecond value found in the microsecond field 76 of the relevant synchronization packet. Because all of the nodes employ the same logic for each synchronization packet received, it follows that all of the nodes will calculate the same, i.e., synchronized, blinking interval once every four seconds.

Once the blinking interval for the node has been determined, the logic illustrated in FIG. 7 is employed. Beginning at block 124, the blinking interval determined by the synchronization packet processing module is retrieved from memory and used to set a countdown clock. At block 126, a test is made to determine if it is time to blink. This test is repeated until it is time to blink. When it is time to blink, at block 128 the LED 27 of the node is triggered to emit a pulse of light. The logic then returns to block 124 and the foregoing steps are repeated. Since the same blinking interval is calculated by all of the nodes, all of the nodes will blink at the same time. In other words, the LEDs of nodes 1 through 6 shown in FIG. 3A will blink in synchrony at the same blinking interval, provided, of course, that the bus network is not broken and none of the nodes are malfunctioning.

Now that the present invention has been described in connection with a bus network which is intact, the invention will next be described in connection with a bus network whose integrity has been lost. As depicted in FIG. 3B, the six node bus network 20 is divided into a first subnetwork 78 comprising nodes 1, 2 and 3 and a second subnetwork comprising nodes 4, 5 and 6 when a break occurs between nodes 3 and 4. After the break occurs, each node in each subnetwork continues to employ the three program modules illustrated in FIGS. 5–7 and described above. As a result and as more fully described below, the LEDs 27 of nodes 1 through 3 of the first subnetwork 78 blink synchronously with respect to one another, the LEDs 27 of nodes 4 through 6 of the second subnetwork 80 blink synchronously with respect to one another. While the LED's of the nodes of the first and second subnetworks blink synchronously, the LEDs of the nodes of the first subnetwork blink asynchronously with respect to the LEDs of the nodes of the second subnetwork. The reason for the asynchronous blinking is described next.

As mentioned earlier, node 1 is the original lowest numbered node of the first subnetwork 78 and node 4 is the new lowest numbered node of the second subnetwork 80. Referring to the synchronization packet generator module illustrated in FIG. 5 and the previous description, it will be appreciated that node 1 will generate synchronization packets for the first subnetwork 78, and node 4 will generate synchronization packets for the second subnetwork 80. More specifically, at decision block 102, each node 1 through 3 of first subnetwork 78 will ask whether it is the lowest numbered node. Since node 1 is the lowest numbered node of the first subnetwork 78, a pass will be made through blocks 104 and 106 only by node 1. Nodes 2 and 3 will bypass those blocks. Consequently, node 1 will generate and broadcast synchronization packets 64 to the other nodes of the first subnetwork. In addition, node 1 will store the data contained in the fields 66 through 72 of the synchronization packet in its own memory. Similarly, node 4 of second subnetwork 80 will determine at decision block 102 that it is the lowest numbered node of the second subnetwork. Nodes 5 and 6 will determine that they are not the lowest numbered node. Thus, a pass will be made through logic blocks 104 and 106 only by node 4. Nodes 5 and 6 will bypass those blocks. Consequently node 4 will generate and broadcast synchronization packets to the other nodes of the second subnetwork and will store the data contained in the synchronization packet in its own memory.

The synchronization packets generated by node 4 will differ from those generated by node 1 because the synchronization packets generated by node 4 will contain a slightly different time stamp at the microsecond level than will the synchronization packets generated by node 1. As described below, it is this difference that causes the LEDs of each subnetwork to blink asynchronously indicating that a break has occurred between nodes 3 and 4.

From the foregoing description, it will be appreciated that each node in both the first subnetwork 78 and the second subnetwork 80 will employ the synchronization packet process module shown in FIG. 6. More specifically, at decision block 112, each node 1 through 3 of the first subnetwork 78 determines if a synchronization packet 64 has been received. As each node receives a synchronization packet, the logic proceeds to blocks 114 through 120 where the synchronization packet is processed to determine if the received synchronization packet is a relevant synchronization packet. If the received synchronization packet is a relevant synchronization packet, a blinking interval for the processing node is determined. Thus, the same blinking interval is determined for each node in the first subnetwork. Likewise, at decision block 112, each node 4 through 6 of the second subnetwork 80, determines if a relevant synchronization packet has been received, and if so, a blinking interval is determined for the node that is the same for each node of the second subnetwork.

Since there is a measurable difference between the microsecond value of the relevant synchronization packets received by the nodes of the first subnetwork 78, and the microseconds value of the relevant synchronization packets received by the nodes of the second subnetwork 80, the blinking interval calculated by the nodes of the first subnetwork will vary from the blinking interval calculated by the nodes of the second subnetwork. Hence, the LEDs 27 of the nodes of the first subnetwork will blink out of synchrony with respect to the LEDs 27 of the nodes of the second subnetwork.

The fact that there is a measurable difference in the microsecond values contained in the microseconds field 76 of the relevant synchronization packets generated by node 1 and node 4 may not be readily apparent because there is no obvious reason why the internal clock of node 4 would drift from the time set it had calibrated only milliseconds prior to when the bus network 20 was broken. While it is true that In terms of relatively large measurements of time such as milliseconds and above, the time difference between the clocks of node 1 and node 4 resulting from clock drift is indistinguishable, this is not true at the microsecond level. At the microsecond level, sufficient clock drift will occur. This is the reason why the clocks of the personal computer bridges 26 and the electronic device interfaces 35 coupled to a bus network must be recalibrated from time to time. In addition, the microsecond variation is largely random. Thus, even if the node 1 and the node 4 from time-to-time send a relevant synchronization packet containing precisely identical time stamps with identical microsecond values, resulting in the LEDs 27 of the first and second subnetworks 78 and 80 blinking at the same blinking interval, this will rapidly change as new relevant synchronization packets containing new time stamps randomly create new blinking intervals.

Finally, once a blinking interval is determined by each of the nodes of the first subnetwork 78, and a blinking interval is determined by each of the nodes of second subnetwork 80, the blinking module illustrated in FIG. 7 is employed by each node of each subnetwork to cause the related LEDs to blink. As a result, the LEDs 27 of the nodes of the first subnetwork 78 blink in synchrony as do the nodes of the second subnetwork 80. However, as discussed above, the blinking interval of the first subnetwork does not equal the blinking interval of the second subnetwork. That is, the LEDs 27 of nodes 1 through 3 blink asynchronously with respect to the LEDs 27 of nodes 4 through 6.

It will be appreciated that if a bus network 20 experiences multiple breaks, the bus network will be divided into a plurality of subnetworks. In such a case, the present invention would cause the LEDs of the nodes in each subnetwork to blink asynchronously with respect to the LEDs of every other subnetwork.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of determining and indicating that a network comprising a plurality of nodes has experienced a break in communication which has resulted in the network being divided into a first subnetwork of one or more nodes and a second subnetwork of one or more nodes, the method comprising:

(a) causing a unique node of the first subnetwork to: (i) store a first stream of synchronization packets, and (ii) if there is more than one node in the first subnetwork, broadcast the first stream of synchronization packets to the other nodes of the first subnetwork, said first stream of synchronization packets including unique data;

(b) causing a unique node of the second subnetwork to: (i) store a second stream of synchronization packets, and (ii) if there is more than one node in the second subnetwork, broadcast the second stream of synchronization packets to the other nodes of the second subnetwork, said second stream of synchronization packets including unique data different from the unique data included in said first stream of synchronization packets;

(c) for each node of said first subnetwork, processing the first stream of synchronization packets to determine a first signaling interval for the node based on the unique data contained in said first stream of synchronization packets;

(d) for each node of said second subnetwork processing the second stream of synchronization packets to determine a second signaling interval for the node based on the unique data contained in said second stream of synchronization packets;

(e) causing each node of the first subnetwork to emit a signal at the first signaling interval so that if there is more than one node in the first subnetwork, the nodes of the first subnetwork emit signals synchronously; and (f) causing each node of the second subnetwork to emit a signal at the second signaling interval so that if there is more than one node in the second subnetwork, the nodes of the second subnetwork emit signals synchronously.

2. The method of claim 1, wherein:

(a) causing a unique node of the first subnetwork to broadcast the first stream of synchronization packets to the other nodes of the first subnetwork comprises:
 (i) determining which node of the first subnetwork is the unique node based on a predetermined protocol;
 (ii) causing the unique node to generate synchronization packets containing the unique data that is used to determine the first signaling interval;
 (iii) causing the unique node to broadcast the synchronization packets to the other nodes of the first subnetwork;
 (iv) waiting for a predefined time interval; and
 (v) repeating (i) through (iv); and (b) causing a unique node of the second subnetwork to broadcast the second stream of synchronization packets to the other nodes of the second subnetwork comprises:
 (i) determining which node of the second subnetwork is the unique node based on a predetermined protocol;
 (ii) causing the unique node to generate synchronization packets containing the unique data that is used to determine the second signaling interval;
 (iii) causing the unique node to broadcast the synchronization packets to the other nodes of the second subnetwork;
 (iv) waiting for a predefined time interval; and
 (v) repeating (i) through (iv).

3. The method of claim 2, wherein:

(a) processing the first stream of unique packets comprises:
 (i) selecting synchronization packets from the first stream of synchronization packets based on a predetermined set of criteria, the predetermined criteria being the same for all nodes of the first subnetwork; and
 (ii) for each selected synchronization packet determining the first signaling interval as a function of the unique data contained in the selected synchronization packet; and (b) processing the second stream of unique packets comprises:
 (i) selecting synchronization packets from the second stream of synchronization packets based on a predetermined set of criteria, the predetermined criteria being the same for all nodes of the second subnetwork; and
 (ii) for each selected synchronization packet, determining the second signaling interval as a function of the unique data contained in the selected synchronization packet.

4. The method of claim 3, wherein the unique data contained in said first and second streams of synchronization packets is a random number.

5. The method of claim 3, wherein the data contained in said first and second streams of synchronization packets comprises the time at which the packets were generated.

6. The method of claim 5, wherein the time at which the packets were generated comprises a seconds value, a milliseconds value and a microseconds value, and wherein said signaling intervals are determined as a function of said microseconds value.

7. The method of claim 6, wherein said predetermined set of criteria used to select synchronization packets from said first and second stream of synchronization packets comprises determining if the seconds value contained in the packet equals a predetermined number.

8. A method for determining and indicating that a plurality of nodes connected to a communication medium have experienced a break in communication, the method comprising:

(a) causing each node to determine if it is a unique node based on a predetermined protocol that results in a (i) single node being determined as unique if no break in communication has occurred; and (ii) more than one node being determined as unique if a break in communication has occurred;

(b) for each node determined to be a unique node, causing the unique node to generate and broadcast a stream of synchronization packets, said synchronization packets including unique data;

(c) causing all of the nodes to process streams of synchronization packets to determine a signaling interval based on the unique data included in said synchronization packets; and (d) causing each node to emit a signal at the signaling interval determined by the node.

9. The method of claim 8, wherein the synchronization packets making up the stream of synchronization packets generated and broadcast by said unique nodes are generated and broadcast at predefined time intervals.

10. The method of claim 9, wherein said nodes process streams of synchronization packets by:

(a) selecting synchronization packets at a particular rate from the stream of synchronization packets received by the node; and (b) for each selected synchronization packet, determining the signaling interval as a function of the unique data contained in the synchronization packet.

11. The method of claim 10, wherein the unique data contained in said synchronization packets is a random number.

12. The method of claim 11, wherein each synchronization packet includes time data that denotes the time that the packet was generated by the unique node that broadcast the packet.

13. The method of claim 12, wherein said time data includes a seconds value, a milliseconds value and a microseconds value, said signaling interval is determined as a function of said microseconds value.

14. The method of claim 13, wherein selecting synchronization packets at a particular rate from the stream of synchronization packets received by a node is based on the seconds value contained in received synchronization packets.

15. Apparatus, included in each of the nodes of a plurality of nodes communicating with one another via a network, for determining and indicating the communication integrity of the network, comprising:

(a) a clock;

(b) an indicator for emitting a signal; and (c) a processing unit electronically coupled to the indicator and the clock for causing the node to:
   (i) determine if the node is a unique node based on a predetermined set of conditions and, if the node is a unique node, causing the node to generate and broadcast synchronization packets to the other nodes connected to the network, said predetermined set of conditions being such that only one node is determined to be a unique node if the integrity of the network is not broken and more than one node is determined to be a unique node if the integrity of the network is broken;
   (ii) process synchronization packets to determine a synchronized signaling interval based on data contained in the synchronization packets; and
   (iii) controlling the indicator so that the indicator emits a signal based on said synchronized signaling interval.

16. The apparatus of claim 15, wherein each of the nodes has an identifying number and wherein the predetermined set of conditions defines the lowest number node of any group of nodes communicating with one another.

17. The apparatus of claim 16, wherein said synchronization packets include time data copied from the clock of the unique node generating synchronization packets.

18. The apparatus of claim 17 wherein said time data includes a microseconds value and wherein said synchronization signaling interval is based on said microsecond value.

19. The apparatus of claim 16, wherein the processing unit of each node processes the synchronization packets to:

(a) determine if a synchronization packet is a relevant synchronization packet; and (b) for each relevant synchronization packet, determining the signaling interval as a function of the data contained in the relevant synchronization packet.

20. The apparatus of claim 19, wherein said synchronization packets include time data copied from the clock of the unique node generating synchronization packets.

21. The apparatus of claim 20 wherein said time data includes a seconds value.

22. The apparatus of claim 21, wherein the processor determines whether the synchronization packet is a relevant synchronization packet as a function of said seconds value.

23. The apparatus of claim 22 wherein said time data includes a microseconds value and wherein said synchronization signaling interval is based on said microsecond value.

24. The apparatus of claim 23, wherein the indicator of each node emits an audible tone.

25. The apparatus of claim 23, wherein the indicator of each node emits a visible light.

* * * * *